（12） United States Patent
Johnson et al.

(10) Patent No.: US 8,161,000 B2
(45) Date of Patent: Apr. 17, 2012

(54) GENERIC BIJECTION WITH GRAPHS

(75) Inventors: Chris D. Johnson, Rochester, MN (US); William Thomas Newport, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 11/969,393

(22) Filed: Jan. 4, 2008

(65) Prior Publication Data

US 2009/0177680 A1     Jul. 9, 2009

(51) Int. Cl.
*G06F 7/00*     (2006.01)
(52) U.S. Cl. ........................................ 707/602; 707/610
(58) Field of Classification Search .................. 707/102, 707/103 R, 103 Z, E17.001, 601–606, 608, 707/610–614, 617–618, 620, 624, 626, 706, 707/756, 781, 802–812, 999.001–999.01, 707/999.1, 999.101–999.107, 999.2–999.206
See application file for complete search history.

(56) References Cited

U.S. PATENT DOCUMENTS

| | | | | |
|---|---|---|---|---|
| 5,615,362 A | * | 3/1997 | Jensen et al. | 1/1 |
| 5,737,736 A | * | 4/1998 | Chang | 1/1 |
| 6,453,321 B1 | * | 9/2002 | Hill et al. | 707/103 Y |
| 6,728,694 B1 | * | 4/2004 | Ramasamy et al. | 707/2 |
| 7,680,767 B2 | * | 3/2010 | Adya et al. | 707/999.002 |
| 2002/0165724 A1 | * | 11/2002 | Blankesteijn | 705/1 |
| 2004/0015516 A1 | * | 1/2004 | Harter et al. | 707/104.1 |
| 2004/0064456 A1 | * | 4/2004 | Fong et al. | 707/100 |
| 2007/0038651 A1 | * | 2/2007 | Bernstein et al. | 707/100 |
| 2008/0228697 A1 | * | 9/2008 | Adya et al. | 707/2 |

* cited by examiner

*Primary Examiner* — Usmaan Saeed
*Assistant Examiner* — Reza Hosseini
(74) *Attorney, Agent, or Firm* — Wood, Herron & Evans LLP

(57) ABSTRACT

A method, apparatus and program product is provided for accessing data in an abstract data store. In response to receiving a key value, an object is created by converting the key value into a key tuple. A value tuple is requested from the abstract data store corresponding to the key tuple. The key tuple and value tuple are converted to the object by a projector, which then stores the object on an object graph. An object is saved to the abstract data store by persisting the object onto the object graph. The object is detected on the object graph by the projector. In response to detecting the object, the object is converted to a key tuple and a value tuple by the projector. The object graph is then synchronized with the abstract data store by pushing the key and value tuples to the abstract data store.

14 Claims, 6 Drawing Sheets

GENERIC BIJECTION WITH GRAPHS

FIELD OF THE INVENTION

The present invention relates to computers and data processing, and more particularly converting between objects and an abstract data store.

BACKGROUND OF THE INVENTION

Data management tasks in object-oriented programming are typically implemented by manipulating objects, which are almost always non-scalar values. Consider the example of an address book entry, which represents a single person along with zero or more phone numbers and zero or more addresses. This could be modeled in an object-oriented implementation by a "person object" with "slots" to hold the data that comprise the entry, e.g., the person's name, a list (or array) of phone numbers, and a list of addresses. The list of phone numbers would itself contain "phone number objects" and so on. The address book entry may be treated as a single value by the programming language (it can be referenced by a single variable, for instance). Various methods can be associated with the object, such as a method to return the preferred phone number, the home address, and so on.

Many popular database products, however, such as SQL DBMS products, can only store and manipulate scalar values such as integers and strings, organized within tables. The developer must either convert the object values into groups of simpler values for storage in the database (and convert them back upon retrieval), or only use simple scalar values within the program. Object-relational mapping is used to implement the first approach. A challenge with object-relational mapping is translating those objects to forms which can be stored in the database, and which can later be retrieved easily, while preserving the properties of the objects and their relationships; these objects are then said to be persistent.

In programming, persistence refers specifically to the ability to retain data structures between program executions, such as, for example, an image editing program saving complex selections or a word processor saving undo history. This is generally achieved in practice by storing the data in non-volatile storage such as a file system, a database, or an object database.

A common type of database used is the relational database. Relational databases use a series of tables to organize data. Data in different tables are associated through the use of declarative constraints, rather than explicit pointers or links. The same data that can be stored in a single object value would likely need to be stored across several of these tables.

An object-relational mapping implementation would need to systematically and predictably choose which tables to use and generate the necessary SQL. Many software applications have been developed to reduce the tedium of developing object-relational mapping systems by providing libraries of classes which are able to perform mappings automatically. Given a list of tables in the database, and objects in the program, they will automatically map requests from one to the other. Asking a "person object" for its "phone numbers" will result in the proper query being created and sent, and the results being translated directly into "phone number objects" inside the program.

Additionally, many middleware projects in the object relation and object database areas have included techniques referred to as bijection. Bijection refers to copying data from a database or store and inserting that data into objects or graphs of objects. The bijector bridges between application provided objects and a relational database defined by a schema. The schema describes the database in terms of entities with keys and attributes as well as relationships between the entities such as one to many, many to one, one to one, etc. The application objects are also annotated with metadata indicating how the database should be projected to these objects (e.g., entity A goes to object B, attribute X of entity B goes to object B's name attribute, etc.). Relationships are similarly mapped. The bijection engine (middleware) can then be called by the application and provided with the relational database to copy data between the application's objects and the database. The application then can examine and/or modify these objects while the middleware determines what has changed and applies the changes to the relational database. J2EE servers, for example, include a Container-Managed Persistence ("CMP") engine that copies/inserts the data between Entity Beans and databases. These CMP engines, as well as other middleware applications, generally only work with relational databases or an application specific backend data store. If application developers want to use a bijection engine for any other purpose then they need to write their own.

What is needed therefore is a bijection engine that is able to work with any abstract data store with a schema, that doesn't require additional programming on the part of application developers.

SUMMARY OF THE INVENTION

Embodiments of the invention address the need in the art by providing a method, apparatus and program product for a bijection engine used for accessing data in an abstract data store to create an object. In response to receiving a key value, in some embodiments of the invention, the key value is converted into a key tuple. A value tuple is requested from the abstract data store, which corresponds to the key tuple. The key tuple and value tuple are converted to an object by a projector and then stored on an object graph by the projector.

Additionally, in some embodiments, the key and value tuples may be checked for relationships to other entities. If a relationship is found, the key value for the relationship is converted into a key tuple, a value tuple is requested from the abstract data store corresponding to the key tuple, and the key tuple and value tuples are converted to a second object by the projector. Multiple key values may also be found that correspond to multiple key tuples and multiple values may then be requested from the abstract data store, such as for a many-to-one relationship. The second object may then be stored on the object graph by the projector and an object reference is defined between the objects. In some embodiments, the abstract data store may communicate directly with the projector, while in other embodiments the abstract data store may communicate with the projector through an intermediate layer.

In some embodiments, requesting a value tuple from the abstract data store includes checking the abstract data store for an existence of the key tuple. If the key tuple is not found, a null value may be returned. If the key tuple is found, the corresponding value tuple may be returned.

Embodiments of the invention address the need in the art by also providing a method, apparatus and program product for a bijection engine used for accessing data in an abstract data store to save an object. The object is persisted onto an object graph. The object is detected on the object graph by the projector, and in response to detecting the object, the object is converted to a key tuple and a value tuple by the projector. The object graph may then be synchronized with the abstract data store by pushing the key and value tuples to the abstract data store.

In some embodiments, synchronizing the object graph with the abstract data store includes checking for the existence of the key and value tuples in the abstract data store. If the key and value tuples are found in the abstract data store, the value tuple may be updated in the abstract data store. If the key and value tuples are not found in the abstract data store, the key tuple and the value tuple are created in the abstract data store. Objects may be removed from the graph. If the key and value tuples are also found in the abstract data store, the key and value tuples are removed from the abstract data store.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Embodiments of the invention address needs in the art by providing a method, apparatus and program product for accessing data in an abstract data store. In response to receiving a key value, an object may be created by converting the key value into a key tuple. A value tuple may then be requested from the abstract data store corresponding to the key tuple. The key tuple and value tuple may then be converted to an object by a projector, which then stores the object on an object graph. An object may be saved to the abstract data store by persisting the object onto the object graph. The object is detected on the object graph by the projector and then may be converted to a key tuple and a value tuple by the projector. The object graph may then be synchronized with the abstract data store by pushing the key and value tuples to the abstract data store.

Figure 1:
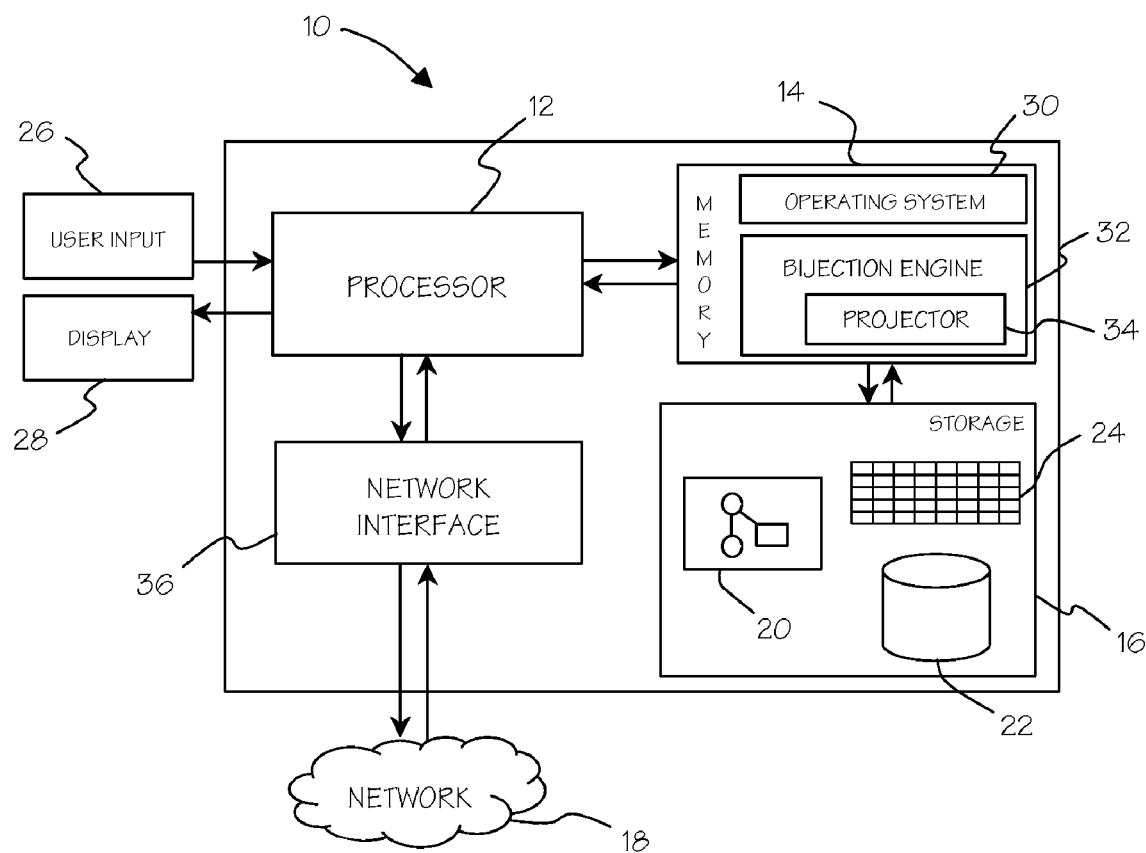
FIG. 1 is a block diagram of an exemplary hardware and software environment for a computer suitable for implementing a generic bijection engine consistent with embodiments of the invention.

Turning now to the drawings, wherein like numbers denote like parts throughout the several views, FIG. 1 illustrates an exemplary hardware and software environment for an apparatus 10 suitable for accessing data in an abstract data store for creating and/or saving objects consistent with the invention. For the purposes of the invention, apparatus 10 may represent practically any computer, computer system, or programmable device e.g., multi-user or single-user computers, desktop computers, portable computers and devices, handheld devices, network devices, mobile phones, etc. Apparatus 10 will hereinafter be referred to as a "computer" although it should be appreciated that the term "apparatus" may also include other suitable programmable electronic devices.

Computer 10 typically includes at least one processor 12 coupled to a memory 14. Processor 12 may represent one or more processors (e.g. microprocessors), and memory 14 may represent the random access memory (RAM) devices comprising the main storage of computer 10, as well as any supplemental levels of memory, e.g., cache memories, non-volatile or backup memories (e.g. programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or another computer coupled to computer 10 via a network 18. The mass storage device 16 may store objects, for example on an object graph 20, databases 22, or any other arbitrary data store 24.

Computer 10 also typically receives a number of inputs and outputs for communicating information externally. For interface with a user or operator, computer 10 typically includes one or more user input devices 26 (e.g., a keyboard, a mouse, a trackball, a joystick, a touchpad, a keypad, a stylus, and/or a microphone, among others). Computer 10 may also include a display 28 (e.g., a CRT monitor, an LCD display panel, and/or a speaker, among others). The interface to computer 10 may also be through an external terminal connected directly or remotely to computer 10, or through another computer communicating with computer 10 via a network 18, modem, or other type of communications device.

Computer 10 operates under the control of an operating system 30, and executes or otherwise relies upon various computer software applications, components, programs, objects, modules, data structures, etc. (e.g. bijection engine 32). The projector 34 of bijection engine 32, for example, may copy/insert data between objects on the object graph 20 and the abstract data store 24. Computer 10 communicates on the network 18 through a network interface 36.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
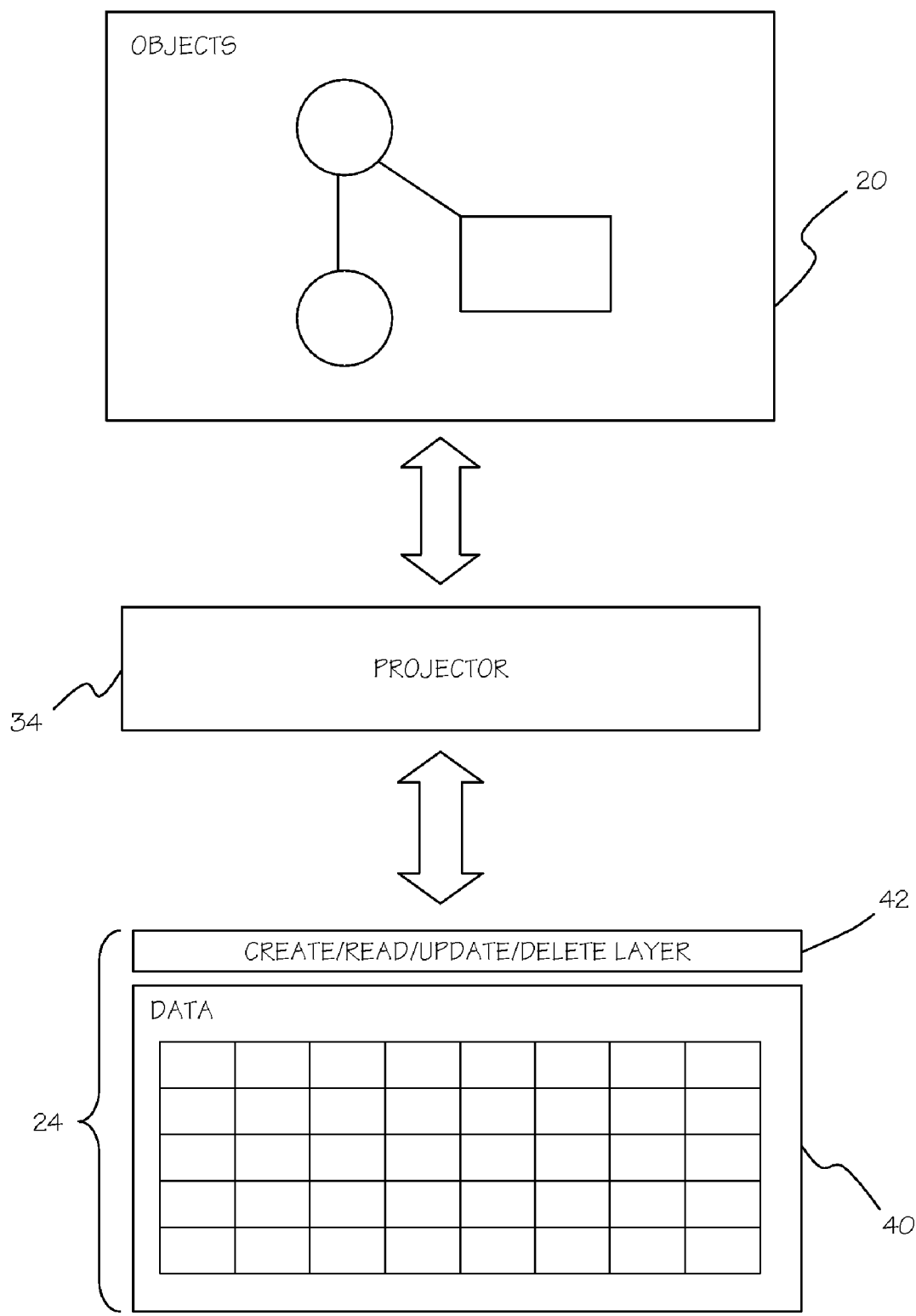
FIG. 2 is a block diagram of the components of the generic bijection engine referenced in FIG. 1.

The block diagram in FIG. 2, shows the components of a bijection engine 32 consistent with embodiments of the invention. The bijection engine 32 is used for converting arbitrary data (stored in maps, database, files, etc.) that has at least a key and value into objects, such as Java® objects. The bijection engine 32 uses three components to convert, manage (update), store, and retrieve objects: a projector 34, an object graph 20 and a data store 24. The engine 32 includes similar functionality of other object to relational mappers (e.g. Java Persistence API, Hibernate, and EJB Container Managed Persistence entity beans), but is not dependent on a relational database 22 as the data store. That is, relationships can be derived for objects (entities) while the data store may be any abstract data store with a schema.

A tuple for purposes of this invention refers to data exchanged between the abstract data store 24 and the object graph 20. A tuple is generally a simply an array of primitive types. A tuple is a simple data structure that contains attributes, association keys to other tuples and metadata, which describes the data. An entity for purposes of this invention includes a key tuple and a tuple for attributes. Entity tuples may also have a list of relationships to other entities.

The data store is an abstract data store 24 for storing tuples. The abstract data store 24, also referred to as a tuple store, allows entities to be manipulated using Create/Read/Update/Delete ("CRUD") methods on the abstract data store 24. This allows entities to be implanted using CRUD operations. The CRUD methods 42 may be implemented on top of any state container 40 in some embodiments. For example, the CRUD layer may be created by the implementation or the bijection engine user. Using the separate CRUD layer, the user may then project data from an abstract data store into the object graph and then unproject the data from the graph into a hash table, or other state container, which could allow transporting/exporting of the object graph state. In other embodiments, the CRUD methods may be integral with the state container 40 providing the abstract data store 24. An abstract data store 24 may be a persistence provider including a relational or non-relational database, a simple map, a hash map, a flat file, etc. Relationships may be stored in the tuples as a collection of key tuples instead of storing a foreign key in an owning table or a join table as is done in relational databases.

The object graph 20 is a graph of all entity instances that will or are currently managed in the abstract data store 24. New entities may be persisted into the graph 20 or existing entities may be found in the graph 20. Updates are performed directly on the entities. The object graph 20 utilized to track the relationships between entities, for example, "person" from the example above has one-to-many bi-directional relationship with "phone number". When a "person" entity is managed, it will have reference to multiple "phone numbers". Likewise, each "phone number" has a relationship to the same "person" instance.

The projector 34 synchronizes the entities referenced in the object graph 20 to a abstract data store 24. The abstract data store 24 is projected onto an object graph 20 for a key or set of keys for a particular entity type. Tuples are fetched from the abstract data store 24, converted to objects and stored in the graph 20. When an object graph 20 is unprojected onto a abstract data store 24, the projector will start at the root level of the graph and proceed down the branches of each of the objects stored on the graph 20 to update/remove/add any tuples as needed, synchronizing the state of the graph 20 with the abstract data store 24. Projecting refers to copying data out of the abstract data store 24 to the object graph 20, while unprojecting refers to pushing data from the object graph 20 back to the abstract data store 24. The projector 34 will follow any relationship, maintaining integrity rules. It may also implement performance features such as lazy relationship inflation, among others.

Figure 3:
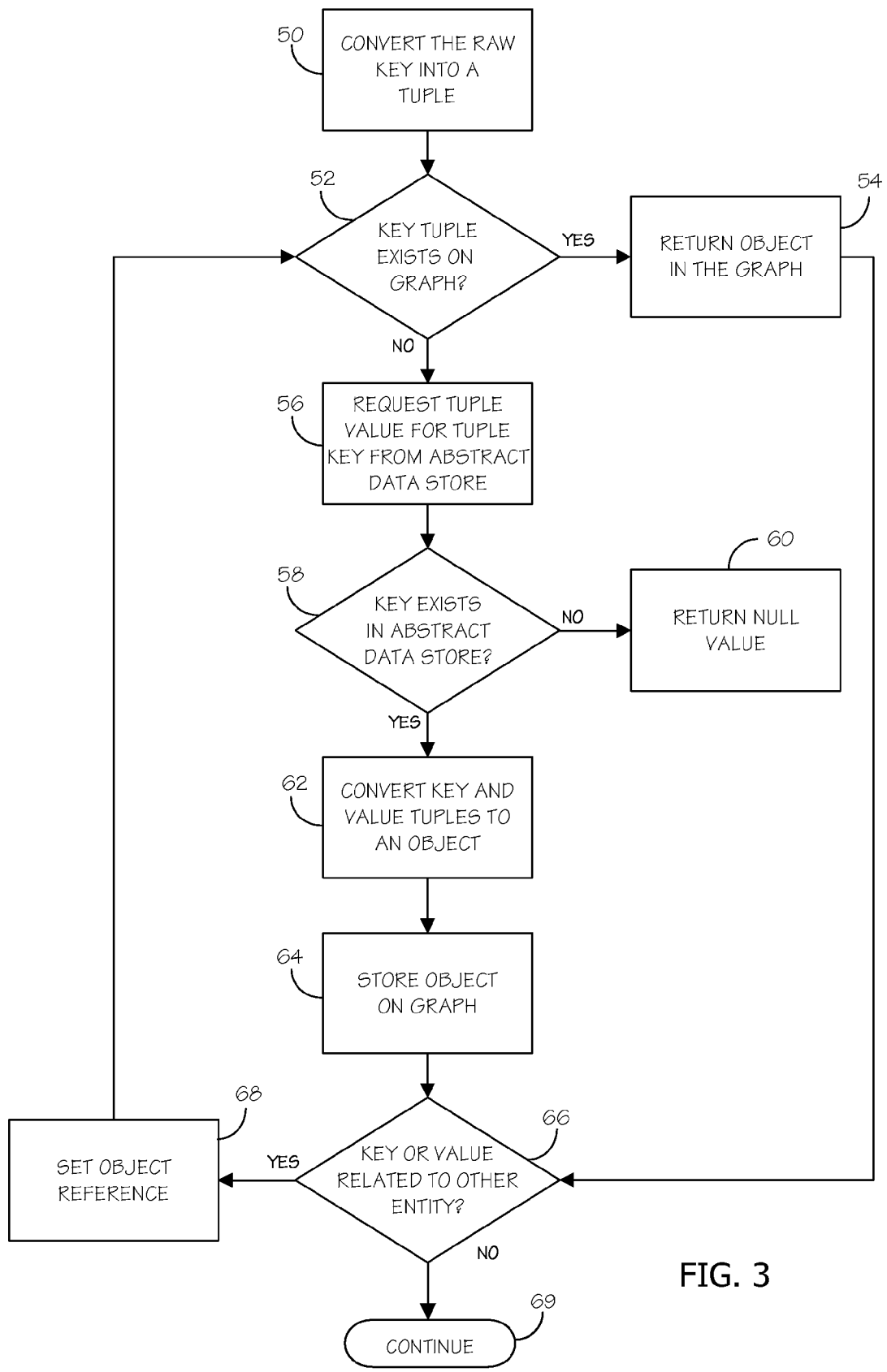
FIG. 3 is a flowchart showing a process of projecting a key onto an object using the bijection engine of FIG. 2.

FIG. 3 is a flowchart showing a process for projecting a key onto an object. In this scenario, a user wants to fetch an entity from the abstract data store 24. To do this, the project method of the projector 34 is called, passing the entity's key, the entity type, the object graph 20 to insert the entity into and the abstract data store 24 to use. Referring now to the flowchart in FIG. 3, the projector 34 then in block 50, the raw key value is converted into a key tuple. If the key tuple exists on the object graph 20 ("YES" branch of decision block 52), then the object from the graph 20 is returned. If the key tuple does not exist on the object graph 20 ("NO" branch of decision block 52), then the projector 34 requests the value tuple for the key tuple from the abstract data store 24 in block 56. If the key does not exist in the abstract data store 24 ("NO" branch of decision block 58), then a null value is returned in block 60. If, however, the key does exist in the abstract data store 24 ("YES" branch of decision block 58), then the key tuple and the value tuple are converted to an object in block 62. The projector 34 then stores the object on the object graph 20 in block 64. If there are no relationships between this key/value and other entities ("NO" branch of decision block 66), then processing of the application continues in block 69.

When the object created from the key and value tuples in block 62 or the object returned from the object graph 20 in block 54 has a relationship with another entity ("YES" branch of decision block 66), the process starts again at block 52 and follows the same sequence as above, but each key may be optionally projected (as a group or independently). The implementation is not important and can be optimized. Additionally a reference between the objects is recorded on the graph 20 by the projector 34 in block 68.

Figure 4:
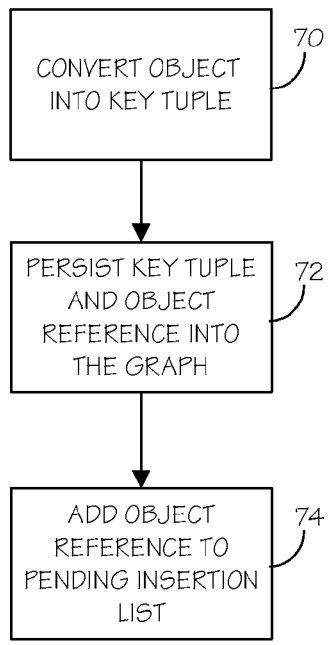
FIG. 4 is a flowchart showing a process of persisting into an object graph using the bijection engine of FIG. 2.

Create, read, update and delete are the four basic functions of persistent storage, a major part of nearly all computer software. Sometimes CRUD is expanded with the words "retrieve" instead of "read" or "destroy" instead of "delete." As discussed above, these operations are used in conjunction with the abstract data store 24. The read function occurs when key and value tuples are retrieved from the abstract data store 24 and projected as objects on the object graph 20 as described above. The create function can be seen in the flowchart in FIG. 4. An object created by an application is converted into a key tuple in block 70. The key tuple and the object are persisted into the object graph 20 in block 72. The object is then added to the pending insertion list in block 74, which will be used when synchronizing the object graph 20 and abstract data store 24. In some embodiments, the abstract data store 24 and the object graph 20 may be continuously synchronized after every transaction with the object graph 20 or abstract data store 24.

Figure 5:
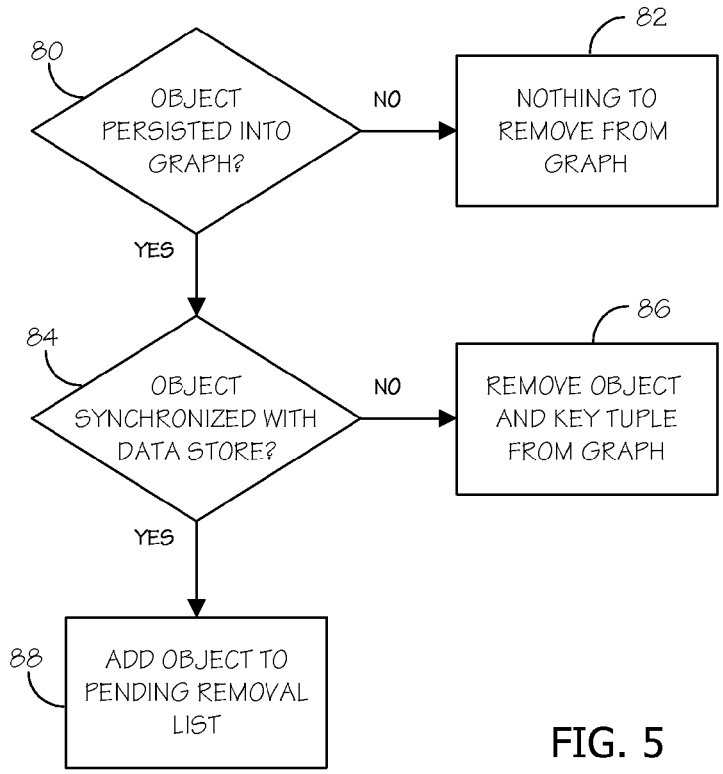
FIG. 5 is a flowchart showing a process of removing an object from an object graph using the bijection engine of FIG. 2.

The remove function may be seen in the flowchart in FIG. 5. If the object has not been persisted into the object graph 20 ("NO" branch of decision block 80), then there is nothing to remove from the graph as noted in block 82. If the object has been persisted into the object graph 20 ("YES" branch of decision block 80), then a check is made in decision block 84 to see if the object has been synchronized with the abstract data store 24. If the object has not been synchronized ("NO" branch of decision block 84), then the object and the corresponding key tuple are removed from the object graph 20 in block 86. Otherwise, if the object has been synchronized with the abstract data store 24 ("YES" branch of decision block 84), then the object is added to the pending removal list in block 88, awaiting the next synchronization between the object graph 20 and abstract data store 24.

Figure 6A:
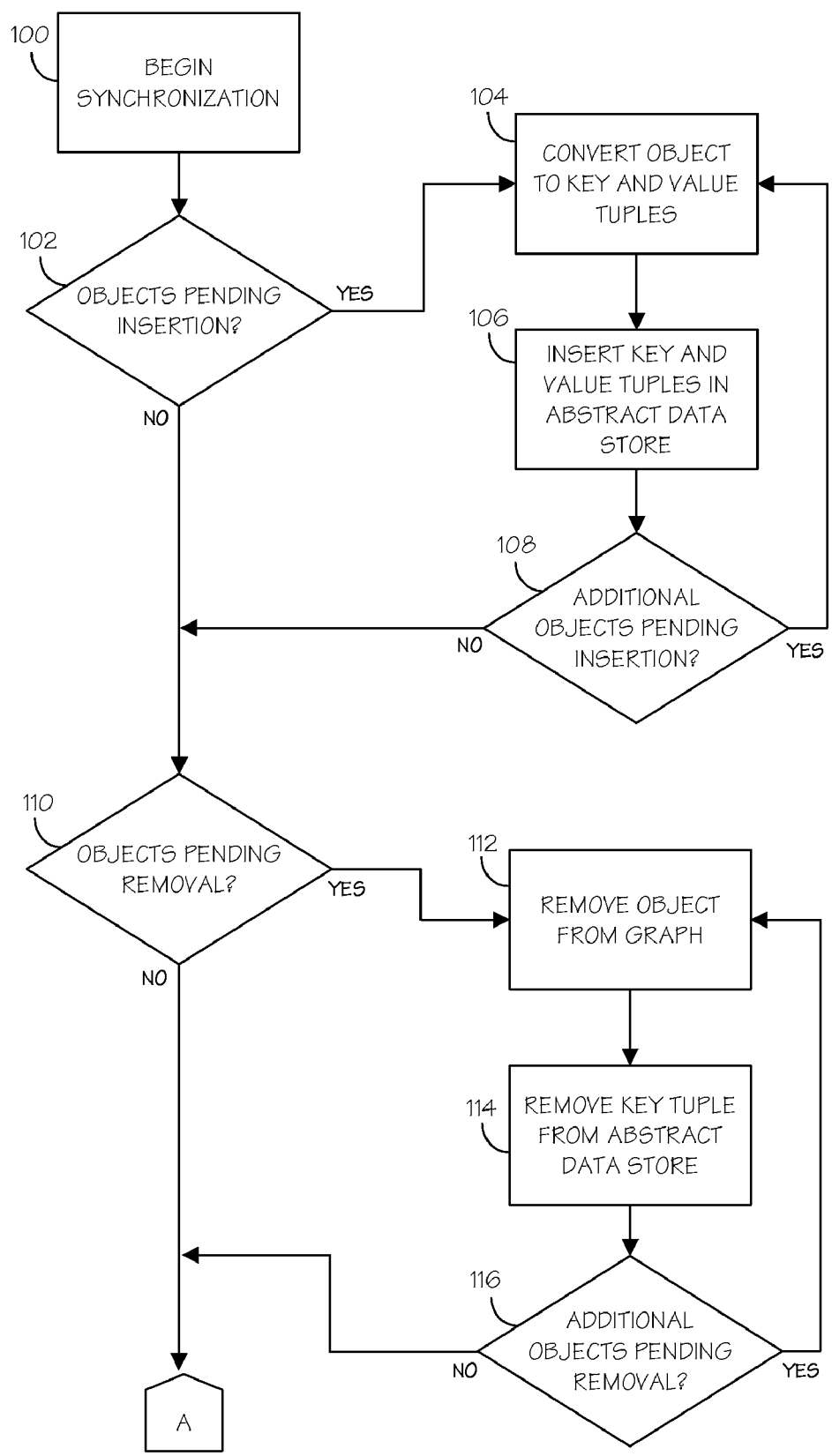
FIGS. 6A and 6B collectively illustrate a flow chart showing a process of synchronizing objects created and updated on and removed from an object graph with an abstract data store using the bijection engine of FIG. 2.
Figure 6B:
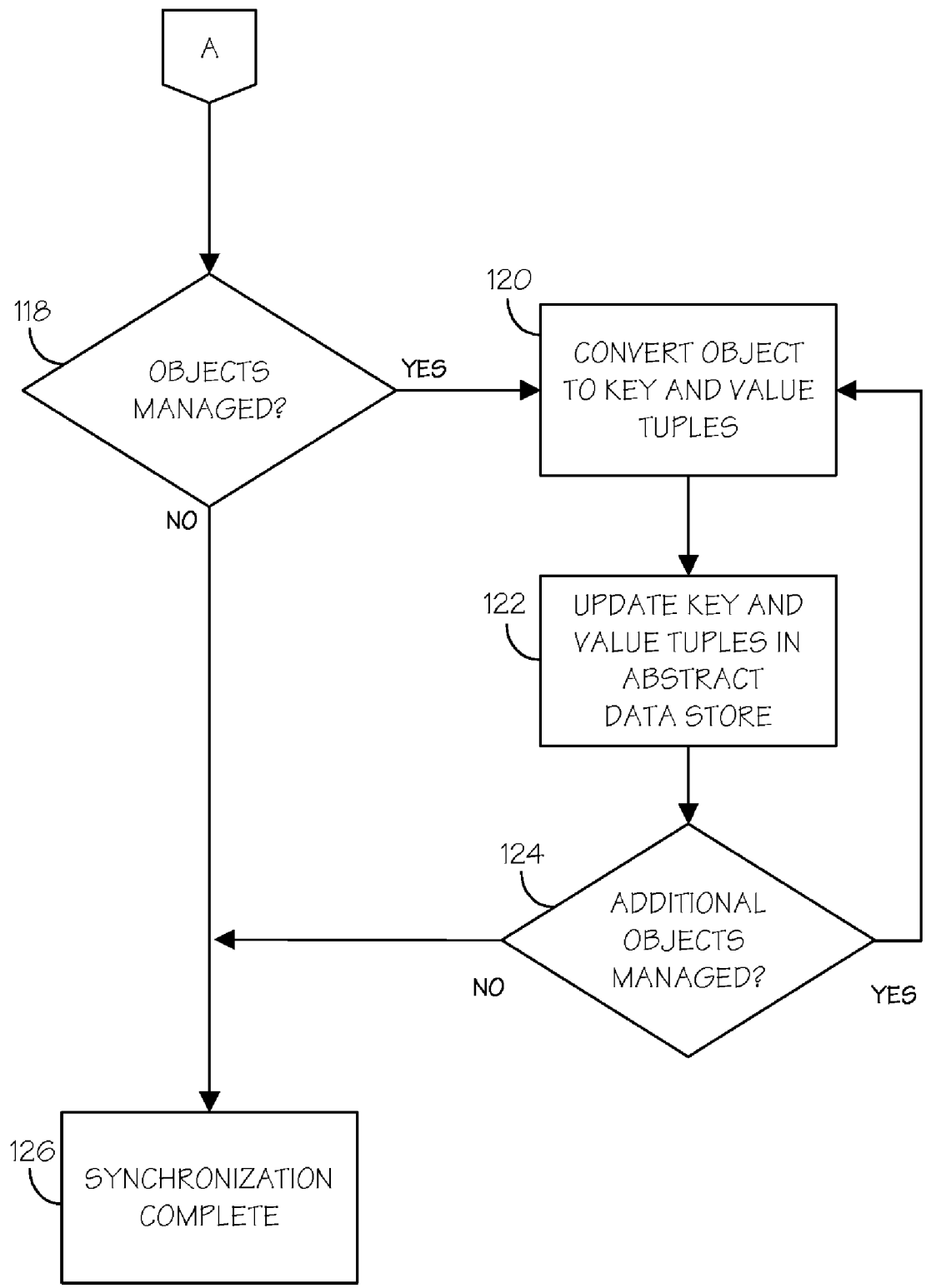

The projector 34 synchronizes the object graph 20 with the abstract data store 24. In some embodiments, the synchronization may occur multiple times within one transaction. In other embodiments, and as discussed above, the object graph 20 and abstract data store 24 may be synchronized at each transaction boundary. A process for synchronization may be seen in FIGS. 6A and 6B, where the synchronization begins in block 100. If objects have been added to the pending insertion list ("YES" branch of decision block 102), then the first object on the list is converted to key and value tuples in block 104. The key and value tuples are inserted or saved in the abstract data store 24 in block 106. If there are additional objects on the pending insertion list ("YES" branch of decision block 108), then the additional objects are each processed using the same steps until the list has been exhausted. Processing then continues in block 110.

If objects have been added to the pending removal list ("YES" branch of decision block 110), then the first object on the list is removed from the object graph 20 in block 112. The key tuple is then removed from the abstract data store 24 in block 114. Removing the key tuple also removes any value tuples associated with that key tuple. If there are additional objects on the pending removal list ("YES" branch of decision block 116), then the additional objects are each removed with their corresponding key/value tuples using the same steps as above until the list has been exhausted. Processing then continues in block 118.

The projector 34 now checks for any objects that have been "managed." If objects are found ("YES" branch of decision block 118), then the first "managed" object encountered is converted to key and value tuples in block 120. The key and value tuples are updated in the abstract data store 24 with the tuples from the object in block 122. If additional "managed" objects exist ("YES" branch of decision block 124), then the additional objects are processed, updating the abstract data store 24, until all "managed" objects have been processed. The synchronization completes in block 126.

While all of the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the applicant's general inventive concept.

What is claimed is:

1. A method of accessing data in an abstract data store to create a first object, the method comprising, in response to receiving a first key value:
   converting the first key value into a first key tuple;
   requesting a first value tuple from the abstract data store corresponding to the first key tuple using a projector;
   converting the first key tuple and first value tuple to the first object by the projector; and
   storing the first object on an object graph by the projector, wherein the abstract data store has a schema and is configured to store key and value tuples, wherein the method further comprises synchronizing the object graph with the abstract data store subsequent to management of the first object by pushing the first key and value tuples to the abstract data store using the projector, wherein the synchronized object graph includes a plurality of objects corresponding to a plurality of key tuples and value tuples stored in the abstract data store,
   the method further comprising:
   checking the first key and value tuple for relationships to other entities;
   in response to finding a first relationship when checking the first key and value tuple for relationships to other entities:
      converting a second key value for the first relationship into a second key tuple,
      requesting a second value tuple from the abstract data store corresponding to the second key tuple using the projector,
      converting the second key tuple and second value tuple to a second object by the projector,
      storing the second object on the object graph by the projector,
      defining first object reference between the first object and the second object, and
      storing the first object reference on the object graph using the projector;
   checking the second key and value tuple of the second object for relationships to other entities; and
   in response to finding a second relationship when checking the second key and value tuple of the second object for relationships to other entities:
      converting a third key value for the second relationship into a third key tuple,
      requesting a third value tuple from the abstract data store corresponding to the third key tuple using the projector,
      converting the third key tuple and third value tuple to a third object by the projector,
      storing the third object on the object graph by the projector,
      defining a second object reference between the second object and the third object, and
      storing the second object reference between the second object and the third object on the object graph using the projector.

2. The method of claim 1 wherein requesting the first value tuple from the abstract data store comprises:
   checking the abstract data store for an existence of the first key tuple;
   in response to not finding the first key tuple, returning a null value; and
   in response to finding the first key tuple, returning the corresponding first value tuple.

3. The method of claim 1 wherein the projector communicates with a Create/Read/Update/Delete ("CRUD") layer on top of the abstract data store.

4. A method of accessing data in an abstract data store to save an object, the method comprising:
persisting the object onto an object graph;
detecting the object on the object graph by a projector;
in response to detecting the object, converting the object to a key tuple and a value tuple by the projector; and
synchronizing the object graph with the abstract data store by pushing the key and value tuples to the abstract data store using the projector,
wherein the abstract data store has a schema and is configured to store key and value tuples, wherein the method further comprises adding the object to a pending list, wherein synchronizing the object graph with the abstract data store includes accessing the object on the pending list, wherein the synchronized object graph includes a plurality of objects corresponding to a plurality of key tuples and value tuples stored in the abstract data store, and wherein synchronizing the object graph with the abstract data store comprises:
removing the object from the object graph;
checking for the existence of the key and value tuples in the abstract data store; and
in response to finding the key and value tuples in the abstract data store, removing the key and value tuples from the abstract data store.

5. The method of claim 4 wherein the projector communicates with a Create/Read/Update/Delete ("CRUD") layer on top of the abstract data store.

6. The method of claim 4 wherein synchronizing the object graph with the abstract data store comprises:
checking for the existence of the key and value tuples in the abstract data store; and
in response to finding the key and value tuples in the abstract data store, updating the value tuple in the abstract data store.

7. The method of claim 4 wherein synchronizing the object graph with the abstract data store comprises:
checking for the existence of the key and value tuples in the abstract data store; and
in response to not finding the key and value tuples in the abstract data store, creating the key tuple and the value tuple in the abstract data store.

8. An apparatus comprising:
a processor; and
program code configured to be executed by the processor for accessing data in an abstract data store to save an object, the program code configured to persist the object onto an object graph, detect the object on the object graph by a projector, convert the object to a key tuple and a value tuple by the projector in response to detecting the object, and synchronize the object graph with the abstract data store by pushing the key and value tuples to the abstract data store using the projector, wherein the abstract data store has a schema and is configured to store key and value tuples, wherein the program code is configured to add the object to a pending list, and to synchronize the object graph with the abstract data store by accessing the object on the pending list, and the synchronized object graph includes a plurality of objects corresponding to a plurality of key tuples and value tuples stored in the abstract data store, wherein the program code is configured to synchronize the object graph with the abstract data store by:
removing the object from the object graph;
checking for the existence of the key and value tuples in the abstract data store; and
in response to finding the key and value tuples in the abstract data store, removing the key and value tuples from the abstract data store.

9. The apparatus of claim 8 wherein the projector communicates with a Create/Read/Update/Delete ("CRUD") layer on top of the abstract data store.

10. The apparatus of claim 8 wherein the program code is configured to synchronize the object graph with the abstract data store by:
checking for the existence of the key and value tuples in the abstract data store; and
in response to finding the key and value tuples in the abstract data store, updating the value tuple in the abstract data store.

11. The apparatus of claim 8 wherein the program code is configured to synchronize the object graph with the abstract data store by:
checking for the existence of the key and value tuples in the abstract data store; and
in response to not finding the key and value tuples in the abstract data store, creating the key tuple and the value tuple in the abstract data store.

12. A program product, comprising:
a non-transitory recordable type medium; and
a program code configured for accessing data in an abstract data store to create a first object, the program code resident on the non-transitory recordable type medium and configured to convert a first key value into a first key tuple, request a first value tuple from the abstract data store corresponding to the first key tuple using a projector, convert the first key tuple and first value tuple to the first object by the projector, and store the first object on an object graph by the projector, wherein the abstract data store has a schema and is configured to store key and value tuples, and wherein the program code is further configured to synchronize the object graph with the abstract data store subsequent to management of the first object by pushing the first key and value tuples to the abstract data store, and wherein the synchronized object graph includes a plurality of objects corresponding to a plurality of key tuples and value tuples stored in the abstract data store, wherein the program code is further configured to check the first key and value tuple for relationships to other entities, and in response to finding a first relationship, convert a second key value for the first relationship into a second key tuple, request a second value tuple from the abstract data store corresponding to the second key tuple using the projector, convert the second key tuple and second value tuple to a second object by the projector, store the second object on the object graph by the projector, define a first object reference between the first object and the second object, and store the first object reference on the object graph using the projector, and wherein the program code is further configured to check the second key and value tuple of the second object for relationships to other entities, and in response to finding a second relationship, convert a third key value for the second relationship into a third key tuple, request a third value tuple from the abstract data store corresponding to the third key tuple using the projector, convert the third key tuple and third value tuple to a third object by the projector, store the third object on the object graph by the projector, define a second object reference between the second object and the third object, and store the second object reference on the object graph using the projector.

13. The program product of claim 12 wherein the program code is configured to request the first value tuple from the abstract data store by:

checking the abstract data store for an existence of the first key tuple;

in response to not finding the first key tuple, returning a null value; and in response to finding the first key tuple, returning the corresponding first value tuple.

14. The program product of claim 12 wherein the projector communicates with a Create/Read/Update/Delete ("CRUD") layer on top of the abstract data store.

* * * * *